(12) United States Patent
Chiou

(10) Patent No.: US 7,924,631 B2
(45) Date of Patent: Apr. 12, 2011

(54) MEMORY CARD AND NON-VOLATILE MEMORY CONTROLLER THEREOF

(75) Inventor: Chin-Hung Chiou, Taipei (TW)

(73) Assignee: InCOMM Technologies Co., Ltd., Taipei (TW)

( * ) Notice: Subject to any disclaimer, the term of this patent is extended or adjusted under 35 U.S.C. 154(b) by 380 days.

(21) Appl. No.: 12/241,057

(22) Filed: Sep. 30, 2008

(65) Prior Publication Data

US 2010/0049901 A1 Feb. 25, 2010

(30) Foreign Application Priority Data

Aug. 20, 2008 (TW) .............................. 97131802 A

(51) Int. Cl.
*G11C 7/10* (2006.01)
(52) U.S. Cl. ................ 365/189.05; 365/189.01; 711/103
(58) Field of Classification Search ............. 365/189.05, 365/189.01, 189.07, 189.08, 233, 201; 711/103, 711/115; 714/719, 718
See application file for complete search history.

(56) References Cited

U.S. PATENT DOCUMENTS

| 5,579,522 | A | 11/1996 | Christeson et al. |
| 5,596,738 | A | 1/1997 | Pope |
| 5,781,921 | A | 7/1998 | Nichols |
| 6,243,789 | B1 | 6/2001 | Hasbun et al. |
| 7,180,803 | B2 * | 2/2007 | Santin ........................ 365/201 |
| 2007/0123192 | A1 * | 5/2007 | Sinai ............................ 455/403 |

* cited by examiner

*Primary Examiner* — Dang T Nguyen
(74) *Attorney, Agent, or Firm* — Jianq Chyun IP Office

(57) ABSTRACT

A memory card and a non-volatile memory controller thereof are provided. The non-volatile memory controller includes a firmware download port group, a memory interface unit, a processing unit, and a host interface unit. The firmware download port group is used for coupled to a firmware update fixture. The memory interface unit includes at least one tri-state buffer component, and the memory interface unit is coupled to a non-volatile memory and the firmware download port group through the tri-state buffer component, wherein the tri-state buffer component determines whether to operate in a high-impedance mode or a normal mode according to a mode single. The processing unit accesses the non-volatile memory through the memory interface unit. When the tri-state buffer component operates in the high-impedance mode according to the mode single, the firmware update fixture writes a new firmware into the non-volatile memory through the firmware download port group.

20 Claims, 10 Drawing Sheets

MEMORY CARD AND NON-VOLATILE MEMORY CONTROLLER THEREOF

CROSS-REFERENCE TO RELATED APPLICATION

This application claims the priority benefit of Taiwan application serial no. 971131802, filed on Aug. 20, 2008. The entirety of the above-mentioned patent application is hereby incorporated by reference herein and made a part of this specification.

BACKGROUND OF THE INVENTION

1. Field of the Invention

The present invention generally relates to a memory controller, and more particularly, to a non-volatile memory controller which can update a firmware directly on a printed circuit board and a memory card using the same.

2. Description of Related Art

Along with the rapid advancement of information technology, storage media developed based on semiconductor techniques have become the mainstream products and which are generally referred to as portable memories, flash memory cards, or memory cards. Compared to the conventional floppy disk and compact disk, portable memory is far more advantageous in its functional characteristics, such as portability, power consumption, data storage, data transmission rate, reread or rewrite, and vibration and damp proof. Due to all these advantages of portable memory, every international electronic product manufacturer has promoted its own portable memory, such as Smart card, PC card (PCMCIA ATA Flash Card), CF card (CompactFlash Card), SM card (Smart Media Card), MMC card (MultiMedia Card), MS card (Memory Stick Card), and SD card (Secure Digital Card), etc, and these portable memories are broadly applied to various digital products. Generally, after a memory card is manufactured, a firmware has to be written into the memory card by using a special fixture called MP-tooling (usually provided by the manufacturer of the memory card).

FIG. 1 is a functional block diagram illustrating how a firmware is written into a conventional multi-chip package (MCP) memory card. Referring to FIG. 1, the MCP integrated circuit (IC) 110 includes a non-volatile memory controller 120 and a plurality of non-volatile memories 160 and 170. The non-volatile memory controller 120 further includes an interface circuit 121, a processing unit 122, and a memory control unit 123. The MCP IC 110 may be a memory chip package conforming to the specification of Smart card, PC card, or SD card, etc.

Herein it is assumed that the non-volatile memory controller 120 is a SD memory card controller, and the non-volatile memories 160 and 170 are flash memory chips. If an external device, for example, a host 140, of the MCP IC 110 is about to access the non-volatile memory 160 or 170, the host 140 has to send a signal to the interface circuit 121 according to the specification of SD memory card. After a fixture 190 receives a new firmware, the fixture 190 sends the new firmware to the processing unit 122 through the interface circuit 121, and the processing unit 122 then writes the new firmware into the non-volatile memory 160 through the memory control unit 123.

In another conventional firmware updating technique, when the memory card becomes invalid or has compatibility problem and accordingly the firmware in the MCP IC 110 is to be updated, the MCP IC 110 soldered on a printed circuit board (PCB) is de-soldered (i.e., removed from the PCB) and then loaded into a specific firmware update fixture 190 to be written with the new firmware. Accordingly, this conventional technique is very inconvenient and costly.

SUMMARY OF THE INVENTION

Accordingly, the present invention is directed to a non-volatile memory controller which can update a firmware directly on a printed circuit board, such that firmware update is made more convenient.

The present invention is also directed to a memory card which can update a firmware directly on a printed circuit board.

The present invention provides a non-volatile memory controller including a firmware download port group, a memory interface unit, a processing unit, and a host interface unit. The firmware download port group is used for coupled to a firmware update fixture. The memory interface unit includes at least one tri-state buffer component, and the memory interface unit is coupled to a non-volatile memory and the firmware download port group through the tri-state buffer component, wherein the tri-state buffer component determines whether to operate in a high-impedance mode or a normal mode according to a mode signal. The processing unit is coupled to the memory interface unit, and the processing unit accesses the non-volatile memory through the memory interface unit. The host interface unit is coupled to the processing unit. The processing unit provides a processing interface through the host interface unit to allow a host to access the non-volatile memory. When the tri-state buffer component operates in the high-impedance mode according to the mode signal, the firmware update fixture writes a new firmware into the non-volatile memory through the firmware download port group.

The present invention also provides a memory card including a non-volatile memory and a non-volatile memory controller. The non-volatile memory controller includes a firmware download port group, a memory interface unit, a processing unit, and a host interface unit. The firmware download port group is coupled to a firmware update fixture. The memory interface unit includes at least one tri-state buffer component, and the memory interface unit is coupled to the non-volatile memory and the firmware download port group through the tri-state buffer component, wherein the tri-state buffer component determines whether to operate in a high-impedance mode or a normal mode according to a mode signal. The processing unit is coupled to the memory interface unit, and the processing unit accesses the non-volatile memory through the memory interface unit. The host interface unit is coupled to the processing unit. The processing unit provides a processing interface through the host interface unit to allow a host to access the non-volatile memory. When the tri-state buffer component operates in the high-impedance mode according to the mode signal, the firmware update fixture writes a new firmware into the non-volatile memory through the firmware download port group.

According to an embodiment of the present invention, the tri-state buffer component is a tri-state buffer.

According to an embodiment of the present invention, the tri-state buffer component includes a buffer and a switch, wherein the switch is coupled between the buffer and the non-volatile memory, and the switch is in an "off" state in the high-impedance mode while in an "on" state in the normal mode.

According to an embodiment of the present invention, the non-volatile memory controller and the non-volatile memory are both packaged in a multi-chip package (MCP).

According to an embodiment of the present invention, a lower side of the MCP is soldered on a printed circuit board (PCB), and the firmware download port group is disposed on an upper side of the MCP.

According to an embodiment of the present invention, a lower side of the MCP is soldered on a PCB, and the firmware download port group is disposed at an edge of the lower side of the MCP.

According to an embodiment of the present invention, a packaged lower side of the non-volatile memory controller is soldered on a PCB, and the firmware download port group is disposed on a packaged upper side of the non-volatile memory controller.

According to an embodiment of the present invention, a packaged lower side of the non-volatile memory controller is soldered on a PCB, and the firmware download port group is disposed at an edge of the packaged lower side of the non-volatile memory controller.

According to an embodiment of the present invention, the non-volatile memory controller further comprises a first memory port group coupled between a control unit and the non-volatile memory.

In the present invention, to update the firmware in a non-volatile memory, a mode signal is input into a memory interface unit to allow a tri-state buffer in the memory interface unit to operate in a high-impedance mode, so that a firmware update fixture can directly write a new firmware into the non-volatile memory on a printed circuit board. Thereby, firmware update is made more convenient.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
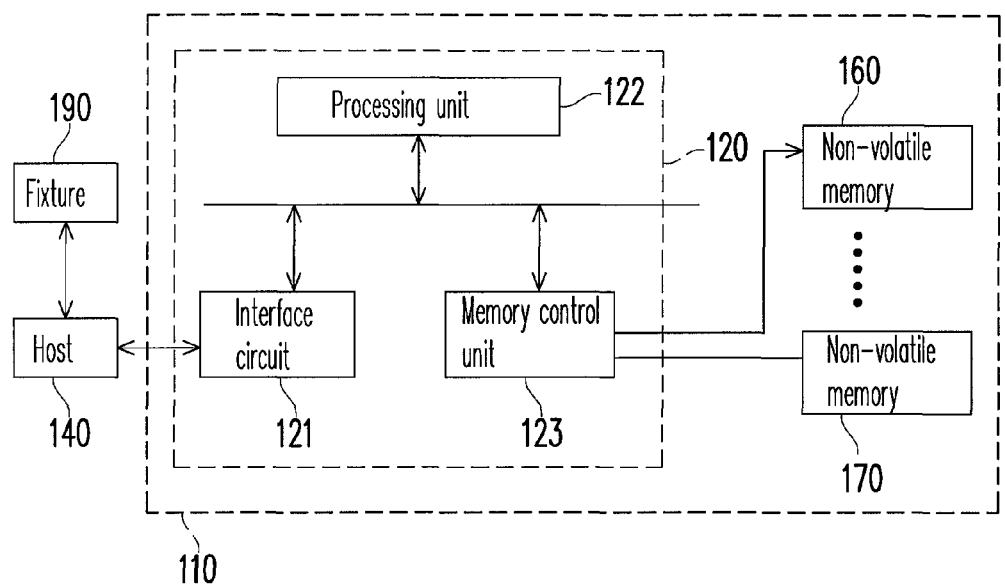
FIG. 1 is a functional block diagram illustrating how a firmware is written into a conventional multi-chip package (MCP) memory card.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
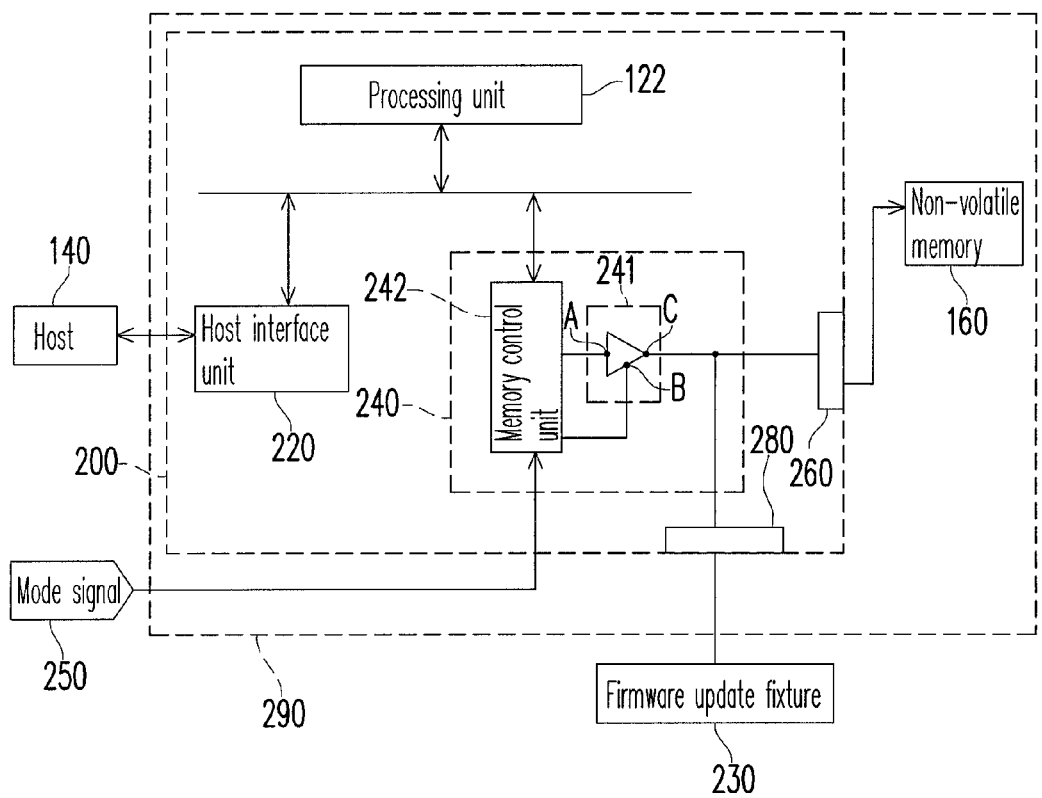
FIG. 2 is a functional block diagram of a memory card according to an embodiment of the present invention.

FIG. 2 is a functional block diagram of a memory card according to the first embodiment of the present invention. Referring to FIG. 2, the non-volatile memory controller 200 provides a processing interface between a host 140 and a non-volatile memory 160 to allow the host 140 to access the non-volatile memory 160. In the present embodiment, the non-volatile memory controller 200 and the non-volatile memory 160 are both packaged in a multi-chip package (MCP) 290. The present embodiment can be applied to a non-volatile memory controller of any type and any specification. For example, the non-volatile memory controller 200 maybe a memory controller conforming to the specification of any memory card in the market, such as a smart card, a PC card, a CF card, a SM card, a MMC card, a MS card, or a SD card. Besides, in the present embodiment, the non-volatile memory 160 may be any programmable read-only memory (ROM), such as a flash memory or an electrically erasable programmable read-only memory (EEPROM).

The non-volatile memory controller 200 includes a host interface unit 220, a processing unit 122, a memory interface unit 240, a firmware download port group 280, and a memory port group 260. In the present embodiment, the memory interface unit 240 includes a memory control unit 242 and a tri-state buffer component 241. The memory control unit 242 can be implemented in any pattern. For example, the memory control unit 242 may be implemented with the same circuit as the memory control unit 123 illustrated in FIG. 1. In addition, the tri-state buffer component 241 in the present embodiment is a tri-state buffer. The firmware download port group 280 and the memory port group 260 may be bounding pad groups of the non-volatile memory controller 200.

The firmware download port group 280 is coupled to a firmware update fixture 230. The memory interface unit 240 is coupled to the non-volatile memory 160 and the firmware download port group 280 through the tri-state buffer component 241. The processing unit 122 is coupled to the memory interface unit 240, and the host interface unit 220 is coupled to the processing unit 122.

Through the control of a control terminal, the tri-state buffer component 241 can let its output terminal to operate in a normal mode (to output logic 0 or logic 1) or a high-impedance mode (the output terminal being in a high-impedance state). For example, in the present embodiment, the tri-state buffer 241 of the memory interface unit 240 determines whether to operate in the high-impedance mode or the normal mode according to a mode signal 250. If the mode signal 250 received from the input terminal B of the tri-state buffer 241 is disabled (at low level), then there will be no current at the output terminal C of the tri-state buffer 241, namely, the output terminal C is in a high-impedance state. Thus, regardless of whether the input terminal A of the tri-state buffer 241 is at high level or low level, the output terminal C thereof is always in an "open" state, and the tri-state buffer 241 operates in the high-impedance mode. Contrarily, if the mode signal 250 received from the input terminal B of the tri-state buffer 241 is enabled (at high level), the output terminal C of the tri-state buffer 241 is equal to the input terminal A thereof, and the tri-state buffer 241 operates in the normal mode.

The processing unit 122 accesses the non-volatile memory 160 through the memory interface unit 240. The host interface unit 220 is coupled to the processing unit 122. The processing unit 122 provides a processing interface to the host 140 through the host interface unit 220 so that the host 140 can access the non-volatile memory 160 through the processing interface. When the processing unit 122 processes an access request of the host 140, the memory control unit 242 performs corresponding operations to the non-volatile memory 160 according to the instructions of the processing unit 122.

Normally, the mode signal 250 controls the tri-state buffer component 241 to be in an enabled state (in the normal mode). Thus, when the host 140 is about to access the non-volatile memory 160, the host 140 can access the non-volatile memory 160 through the non-volatile memory controller 200.

It should be noted that if a firmware stored in the non-volatile memory 160 is to be updated, the mode signal 250 controls the tri-state buffer component 241 to be in an disabled state (in the high-impedance mode) so that the output terminal C of the tri-state buffer (the tri-state buffer component 241) is in the "open" state. In this case, the firmware update fixture 230 is connected to the firmware download port group 280. Thus, in this case, only the firmware update fixture 230 is connected to the non-volatile memory 160 through the firmware download port group 280 and the memory port group 260. Then the firmware update fixture 230 writes a new firmware into the non-volatile memory 160 through the firmware download port group 280 and the memory port group 260 based on an access protocol compatible to the non-volatile memory 160. Since the circuit path connected to the non-volatile memory 160 is always switched to the "open" state in the high-impedance mode, no other circuit will be affected when the firmware update fixture 230 writes the new firmware into the non-volatile memory 160. As a result, the problem of bus contention is avoided. Thereby, the non-volatile memory controller 200 in the present invention can update a firmware directly on a printed circuit board. Accordingly, firmware update is made more convenient.

The mode signal 250 is an external signal of the non-volatile memory controller 200 and which can be set through any method. For example, the mode signal 250 can be provided/set by the firmware update fixture 230. When the firmware update fixture 230 is connected to the non-volatile memory controller 200, the firmware update fixture 230 makes the tri-state buffer component 241 to operate in the high-impedance mode through the control of the mode signal 250 and then writes the new firmware into the non-volatile memory 160 through the firmware download port group 280 and the memory port group 260. In another embodiment of the present invention, the mode signal 250 may also be set by using a jumper element disposed on the printed circuit board (PCB).

In the embodiment described above, the non-volatile memory controller 200 and the non-volatile memory 160 can be integrated into the same IC (or chip) or may also be implemented in different ICs (or chips). If the non-volatile memory controller 200 and the non-volatile memory 160 are respectively implemented in different ICs (or chips), they can be fabricated through any packaging technique. For example, the non-volatile memory controller 200 and the non-volatile memory 160 can be packaged together into a MCP. Or, the non-volatile memory controller 200 and the non-volatile memory 160 can be respectively packaged in different IC packages.

Second Embodiment

Figure 3:
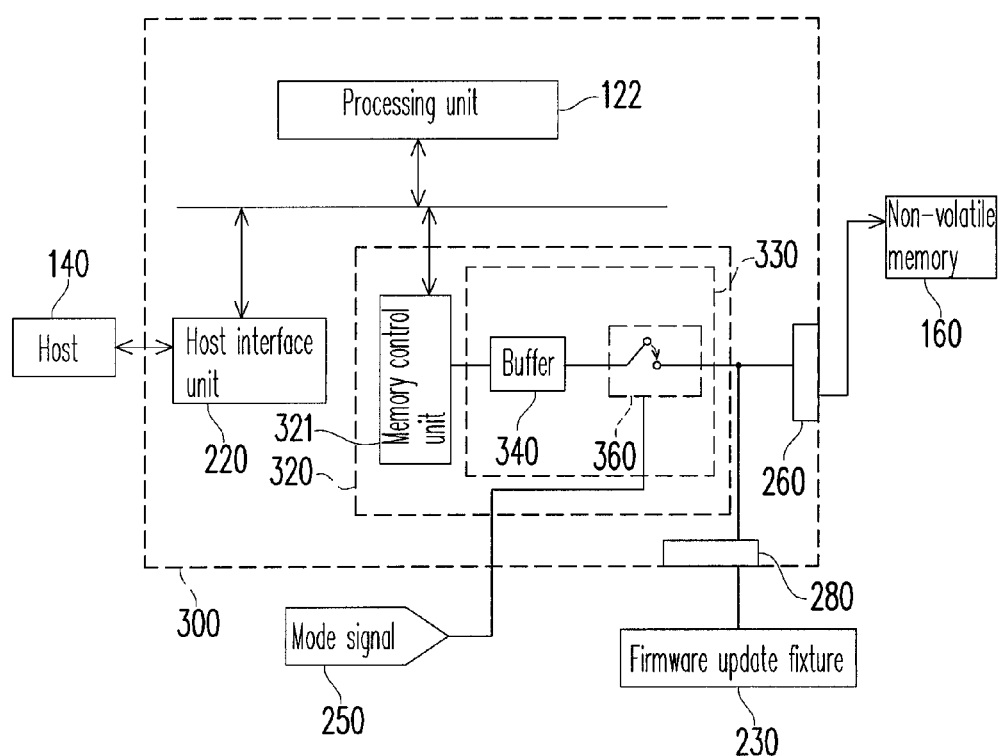
FIG. 3 is a functional block diagram of a non-volatile memory controller according to an embodiment of the present invention.

FIG. 3 is a functional block diagram of a non-volatile memory controller 300 according to the second embodiment of the present invention. The difference between the first embodiment illustrated in FIG. 2 and the second embodiment illustrated in FIG. 3 is that in the second embodiment, the function of the tri-state buffer component 330 in the memory interface unit 320 is accomplished by using different elements. Referring to FIG. 3, the tri-state buffer component 330 in the memory interface unit 320 includes a buffer 340 and a switch 360. The switch 360 is coupled between the buffer 340 and the non-volatile memory 160. The switch 360 is in an "off" state in the high-impedance mode while in an "on" state in the normal mode. Besides the memory interface unit 320, the other functional blocks in FIG. 3 are similar to those in FIG. 2 therefore will not be described herein.

The switch 360 can be turned on (i.e., in the normal mode) or turned off (i.e., in the high-impedance mode) through the control of the mode signal 250. For example, in the normal mode, the mode signal 250 turns on the switch 360. Accordingly, when the host 140 is about to access the non-volatile memory 160, the host 140 can access the non-volatile memory 160 through the non-volatile memory controller 300. In addition, if a firmware stored in the non-volatile memory 160 is to be updated, the tri-state buffer component 330 is allowed to operate in the high-impedance mode (i.e., the switch 360 is in the "off" state) by setting the state of the mode signal 250. Then, the firmware update fixture 230 is connected to the firmware download port group 280. In this case, only the firmware update fixture 230 is connected to the non-volatile memory 160 through the firmware download port group 280 and the memory port group 260. Thus, the firmware update fixture 230 can update the firmware in the non-volatile memory 160 through the firmware download port group 280 and the memory port group 260.

In the first and second embodiments described above, each state of the mode signal 250 (for example, high level or low level) is corresponding to which mode (the normal mode or the high-impedance mode) of the tri-state buffer component 241 or 330 can be determined according to the actual requirement. However, the level of the mode signal 250 and the corresponding mode are not limited in the present embodiment.

Third Embodiment

Figure 4:
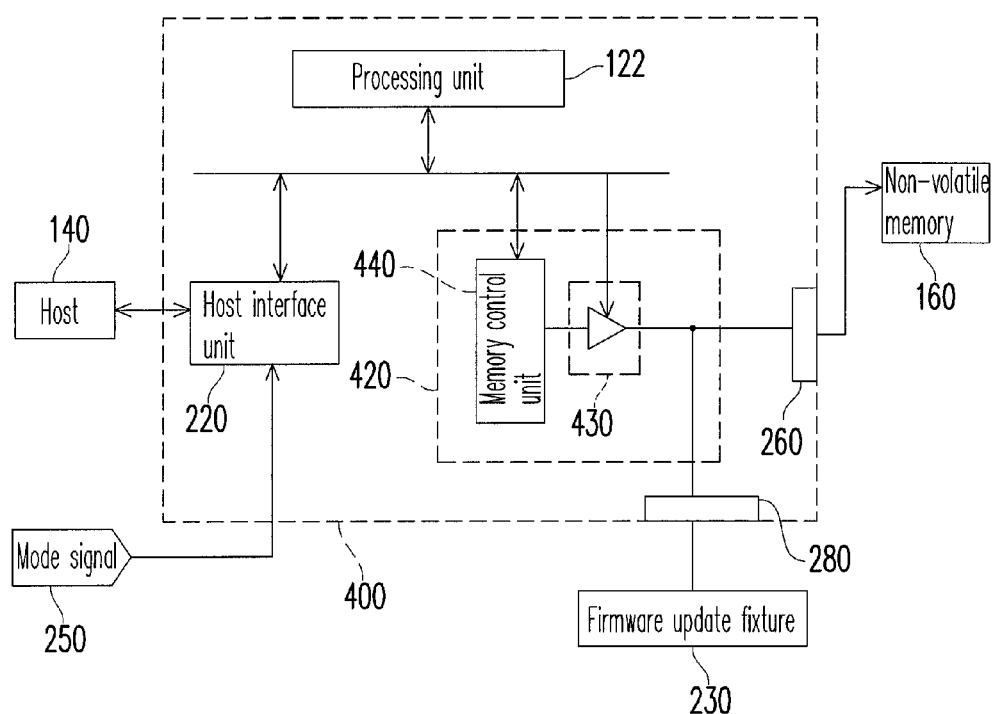
FIG. 4 is a functional block diagram of a non-volatile memory controller according to another embodiment of the present invention.

FIG. 4 is a functional block diagram of a non-volatile memory controller according to the third embodiment of the present invention. Referring to FIG. 4, the difference between the present embodiment and the first embodiment is that in the present embodiment, the mode signal 250 is coupled to the host interface unit 220. Besides the coupling of the mode signal 250, the other functional blocks in FIG. 3 are similar to those in FIG. 2 therefore will not be described herein.

The mode signal 250 is sent to the processing unit 122 through the host interface unit 220. The processing unit 122 issues a command according to the mode signal 250 to the tri-state buffer component 430 of the memory interface unit 420 through a bus. The mode signal 250 controls the tri-state buffer component 430 to operate in the high-impedance mode or the normal mode. When the tri-state buffer component 430 operates in the high-impedance mode, the firmware update fixture 230 can update the firmware in the non-volatile memory 160 directly on the circuit board. The tri-state buffer component 430 may be implemented by referring to the tri-state buffer component 241 illustrated in FIG. 2 or the tri-state buffer component 330 illustrated in FIG. 3, or the tri-state buffer component 430 may also be implemented through other methods.

Fourth Embodiment

Figure 5:
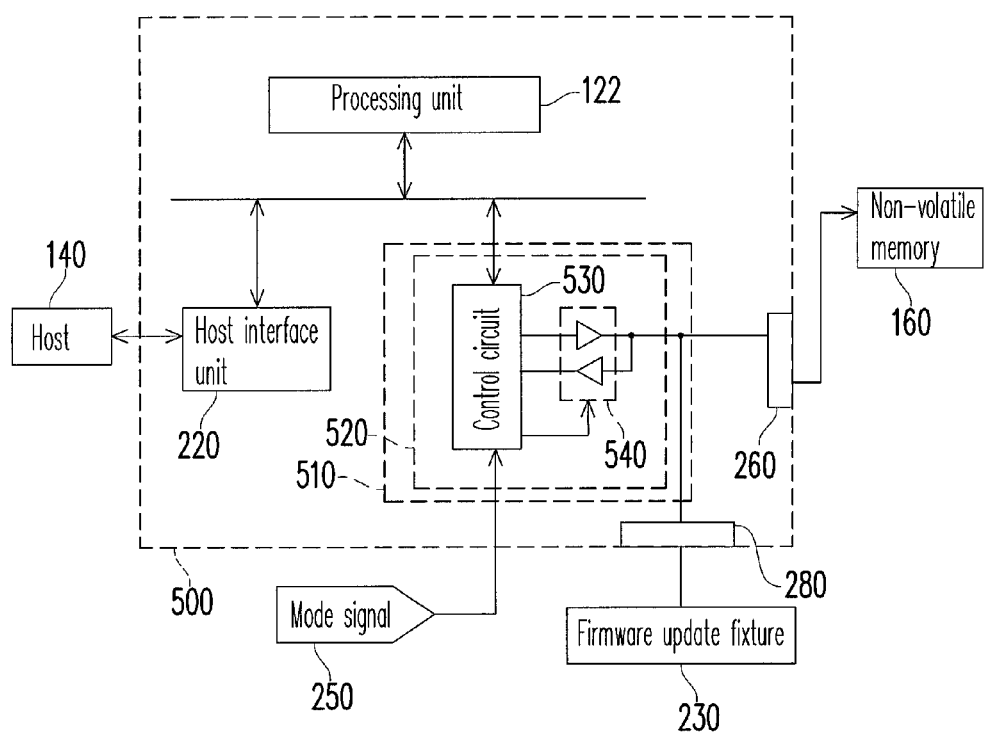
FIG. 5 is a functional block diagram of a non-volatile memory controller according to yet another embodiment of the present invention.

FIG. 5 is a functional block diagram of a non-volatile memory controller 500 according to the fourth embodiment of the present invention. Referring to FIG. 5, the difference between the present embodiment and the first embodiment is that in the present embodiment, the tri-state buffer component of the memory interface unit 510 is implemented by using a bidirectional buffer 540 in the memory control unit 520. By serving the bidirectional buffer 540 as the tri-state buffer component, no additional tri-state buffer component is to be disposed between the memory control unit 520 and the non-volatile memory 160 in the memory interface unit 510. In the present embodiment, besides the memory interface unit 510, the other functional blocks in FIG. 5 are similar to those in FIG. 2 therefore will not be described herein.

The memory control unit 520 includes a control circuit 530 and at least one bidirectional buffer 540. The mode signal 250 is sent to the control circuit 530. In the normal mode, the mode signal 250 is disabled, and the control circuit 530 correspondingly sets the bidirectional buffer 540 to be in an input buffer mode, an output buffer mode, or the high-impedance mode according to the control of the processing unit 122. Accordingly, the processing unit 122 can access the non-volatile memory 160 through the control circuit 530. Thus, when the host 140 is about to access the non-volatile memory 160, the host 140 can access the non-volatile memory 160 through the non-volatile memory controller 500. If a firmware stored in the non-volatile memory 160 is to be updated, the mode signal 250 is set to the enabled state so that the control circuit 530 is temporarily out of the control of the processing unit 122. The control circuit 530 correspondingly sets the bidirectional buffer 540 to the high-impedance mode (i.e., the connection port between the bidirectional buffer 540 and the memory port group 260 is in the high-impedance state) according to the mode signal 250. Thus, when the bidirectional buffer 540 (i.e., the tri-state buffer component) operates in the high-impedance mode, the firmware update fixture 230 can update the firmware in the non-volatile memory 160 directly on the circuit board.

Fifth Embodiment

Figure 6:
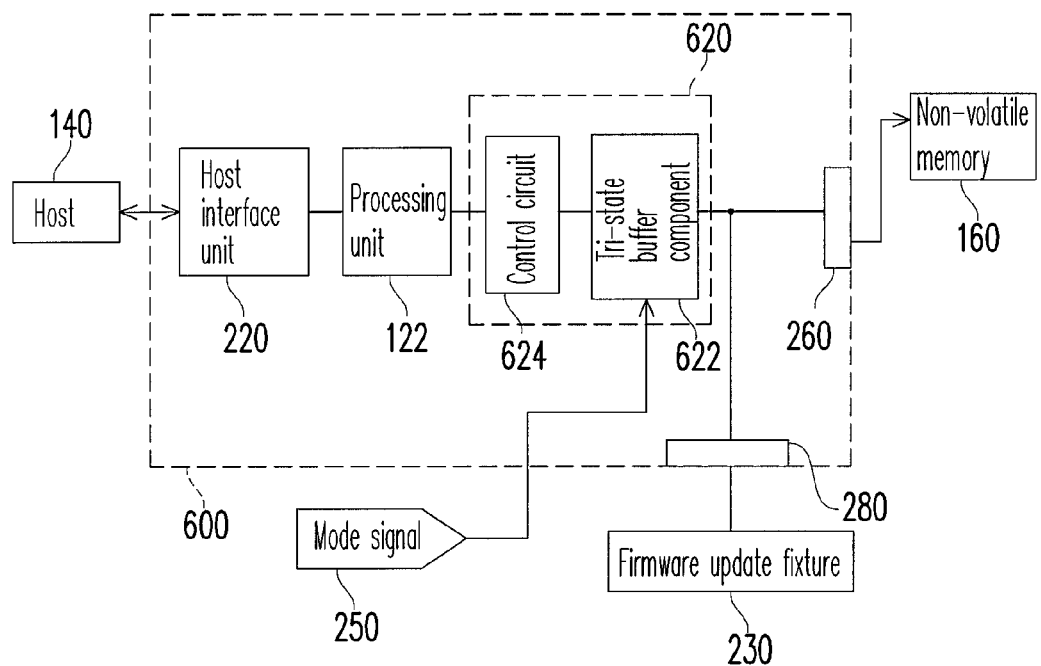
FIG. 6 is a functional block diagram of a non-volatile memory controller according to still another embodiment of the present invention.

FIG. 6 is a functional block diagram of a non-volatile memory controller according to the fifth embodiment of the present invention. Referring to FIG. 6, in the fifth embodiment, the processing unit 122 of the non-volatile memory controller 600 is connected between the host interface unit 220 and the memory interface unit 620 in series. Besides the series connection, the other functional blocks in the present embodiment are the same as those in the first embodiment therefore will not be described herein.

When the host 140 is about to access the non-volatile memory 160, the mode signal 250 is sent to the tri-state buffer component 622 in the memory interface unit 620 as a high level enabling signal to allow the tri-state buffer component 622 to operate in the normal mode. Accordingly, the host 140 can access the non-volatile memory 160 through the non-volatile memory controller 600. It should be noted that to if a firmware stored in the non-volatile memory 160 is to be updated, the mode signal 250 is sent to the tri-state buffer component 622 in the memory interface unit 620 as a low level enabling signal to allow the tri-state buffer component 622 to operate in the high-impedance mode. In this case, only the firmware update fixture 230 is connected to the non-volatile memory 160 through the firmware download port group 280. Thus, the firmware update fixture 230 can update the firmware stored in the non-volatile memory 160 through the firmware download port group 280 and the problem of bus contention can be avoided. The implementation of the tri-state buffer component 622 can be referred to the first and second embodiment described above and will not be described herein.

In the embodiments described above, the non-volatile memory controller 300, 400, 500, or 600 and the non-volatile memory 160 can be integrated into the same IC (or chip) or may also be respectively implemented in different ICs (or chips). If the non-volatile memory controller 300, 400, 500, or 600 and the non-volatile memory 160 are respectively implemented in different ICs (or chips), they can be fabricated through any packaging technique. For example, the non-volatile memory controller 300, 400, 500, or 600 and the non-volatile memory 160 can be packaged together into a MCP. Or, the non-volatile memory controller 300, 400, 500, or 600 and the non-volatile memory 160 can be respectively packaged in different IC packages.

The non-volatile memory controller in foregoing first, second, third, fourth, or fifth embodiment has a plurality of port groups, such as the firmware download port group 280 and the memory port group 260. If the non-volatile memory controller and the non-volatile memory are packaged together in a MCP (for example, in a memory card package), it is not needed to dispose any corresponding pin on the surface of the MCP since the memory port group 260 is packaged within the MCP. Herein a surface of the MCP which is soldered on a PCB (not shown) is defined as a "lower side". The firmware download port group 280 may be disposed in the center of the lower side, at an edge of the lower side, or on an upper side of the MCP according to the actual requirement.

Additionally, if the non-volatile memory controller 200, 300, 400, 500, or 600 and the non-volatile memory 160 are independently packaged, the memory port group 260 can be disposed at the packaged lower side of the non-volatile memory controller to be soldered on the PCB. The firmware download port group 280 can be disposed in the center of the lower side, at an edge of the lower side, or on an upper side of the non-volatile memory controller according to the actual requirement.

The dispositions of foregoing port groups can be determined by those having ordinary knowledge in the art according to the requirement of the circuit layout. The dispositions of these port groups in the present invention are not limited to foregoing descriptions of the present embodiment. Below, the disposition of the firmware download port group in some embodiments of the present invention will be described with reference to accompanying structural diagrams and exploded diagrams of MCPs.

Figure 7:
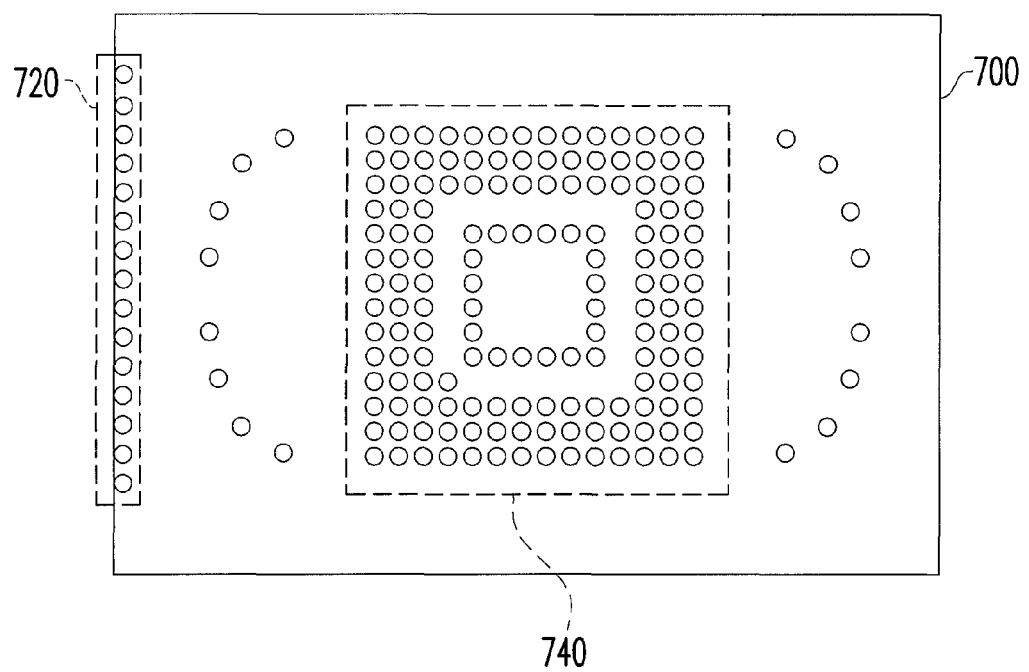
FIG. 7 is a diagram illustrating the disposition of pins of a MCP according to an embodiment of the present invention.

FIG. 7 is a diagram illustrating the disposition of pins of a MCP according to an embodiment of the present invention. Referring to FIG. 7, a lower side of the MCP 700 is illustrated. The MCP 700 includes a non-volatile memory controller and a non-volatile memory. The MCP 700 may be a memory card. The layout of the port group 740 in the center of the lower side of the MCP 700 can be determined by a designer. The port group 740 may include a power port group, a ground port group, and a host access port group. More importantly, in the present invention, the firmware download port group 720 (the firmware download port group 280 in FIG. 2, 3, 4, or 5) can be disposed at an edge of the lower side of the MCP 700 to reduce the complexity of the circuit layout and to make wiring to an external fixture easier. The connection between the MCP 700 and the fixture will be described below with reference to FIG. 8 and FIG. 9.

Figure 8:
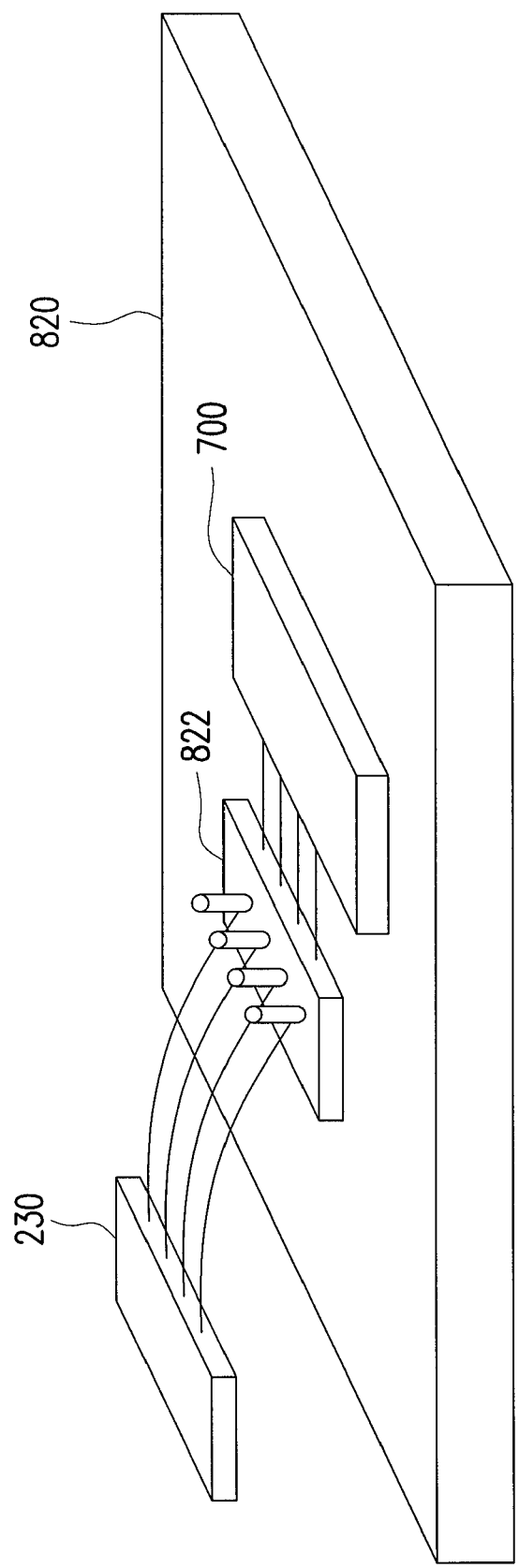
FIG. 8 is a diagram illustrating the connection between a MCP and a fixture according to an embodiment of the present invention.

FIG. 8 is a perspective view illustrating the connection between the MCP 700 and a fixture 230 according to an embodiment of the present invention. Referring to both FIG. 7 and FIG. 8, the MCP 700 and a connector 822 are disposed on the PCB 820 in FIG. 8. The MCP 700 is soldered on the PCB 820, namely, the pins (for example, the firmware download port group 720) on the lower side of the MCP 700 (as shown in FIG. 7) are soldered to the corresponding bounding pads on the PCB 820. The firmware download port group 720 is connected to the connector 822 through the layout of the PCB 820. Even though a male adaptor is used for representing the connector 822 in FIG. 8, the implementation of the connector 822 is not limited thereto, and the connection between the fixture 230 and the connector 822 is not limited to the pattern shown in FIG. 8. For example, in another embodiment of the present invention, the fixture 230 may have a plurality of probes for contacting the connector 822, and the connector 822 may be a male adaptor (socket) having a plurality of holes; thus, the fixture 230 and the connector 822 can be electrically connected to each other by inserting the probes into the holes of the connector 822.

The fixture 230 can be connected to the non-volatile memory controller (for example, the non-volatile memory controller illustrated in FIG. 2, 3, 4, 5, or 6) inside the MCP 700 through the connector 822 and the firmware download port group 720. Thus, the firmware can be updated based on the descriptions of foregoing embodiments to allow the fixture 230 to write a new firmware into the non-volatile memory 160. The process and method for updating the firmware will not be described herein.

Figure 9:
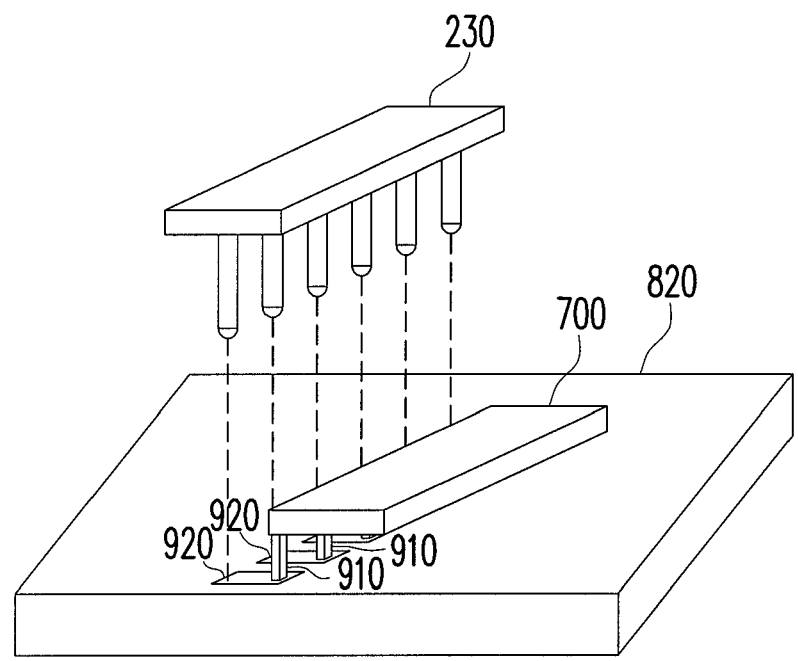
FIG. 9 is an exploded view illustrating the connection between a MCP and a fixture according to another embodiment of the present invention.

FIG. 9 is an exploded view illustrating the connection between a MCP and a fixture according to another embodiment of the present invention. Referring to FIG. 9, the difference between FIG. 9 and FIG. 8 is that the connector 822 is omitted in FIG. 9. A bounding pad 920 is respectively disposed corresponding to each pin 910 of the firmware download port group 720 on the surface of the PCB 820 and at an edge of the lower side of the MCP 700. The bounding pads 920 respectively have an extension towards the opposite direction of the MCP 700 such that the probes of the fixture 230 can contact the extensions of the bounding pads 920 correspondingly. Since the firmware download port group 720 is disposed at the edge of the lower side of the MCP 700, the bounding pads 920 and the extensions thereof take up only a small portion of the surface of the PCB720.

Figure 10:
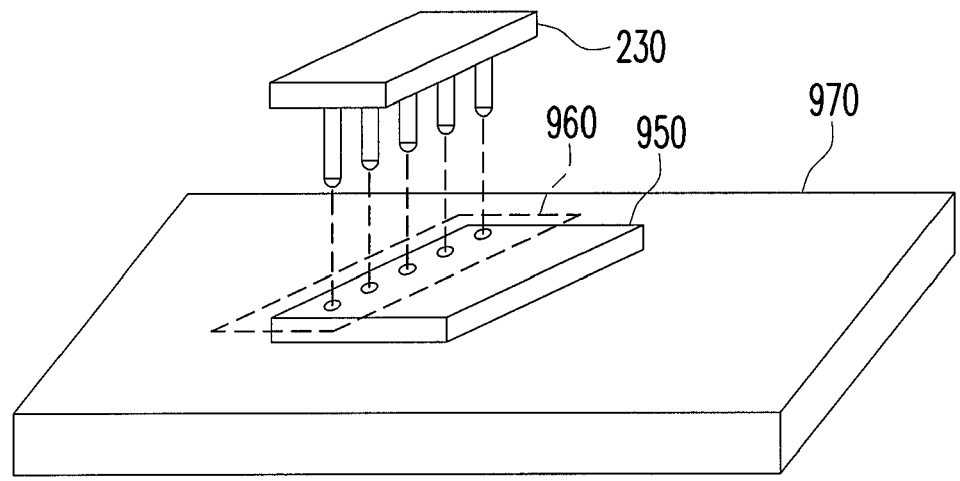
FIG. 10 is an exploded view illustrating the connection between a MCP and a fixture according to yet another embodiment of the present invention.

FIG. 10 is an exploded view illustrating the connection between a MCP and a fixture according to yet another embodiment of the present invention. Referring to FIG. 10, the difference between the MCP 950 in FIG. 10 and the MCP 700 in FIG. 7 is about the disposed position of the firmware download port group. In FIG. 7, the firmware download port group 720 is disposed at the edge of the lower side of the MCP 700, while in FIG. 10, the firmware download port group 960 is disposed on an upper side of the MCP 950. Since the firmware download port group 960 is disposed on the upper side of the MCP 950, the probes of the fixture 230 can directly contact the firmware download port group 960 to carry out the firmware update operation. Since the firmware download port group 960 is disposed on the upper side of the MCP 950, it does not take up any of the layout area of the PCB 970, and the convenience for connecting the fixture 230 is greatly improved.

Figure 11:
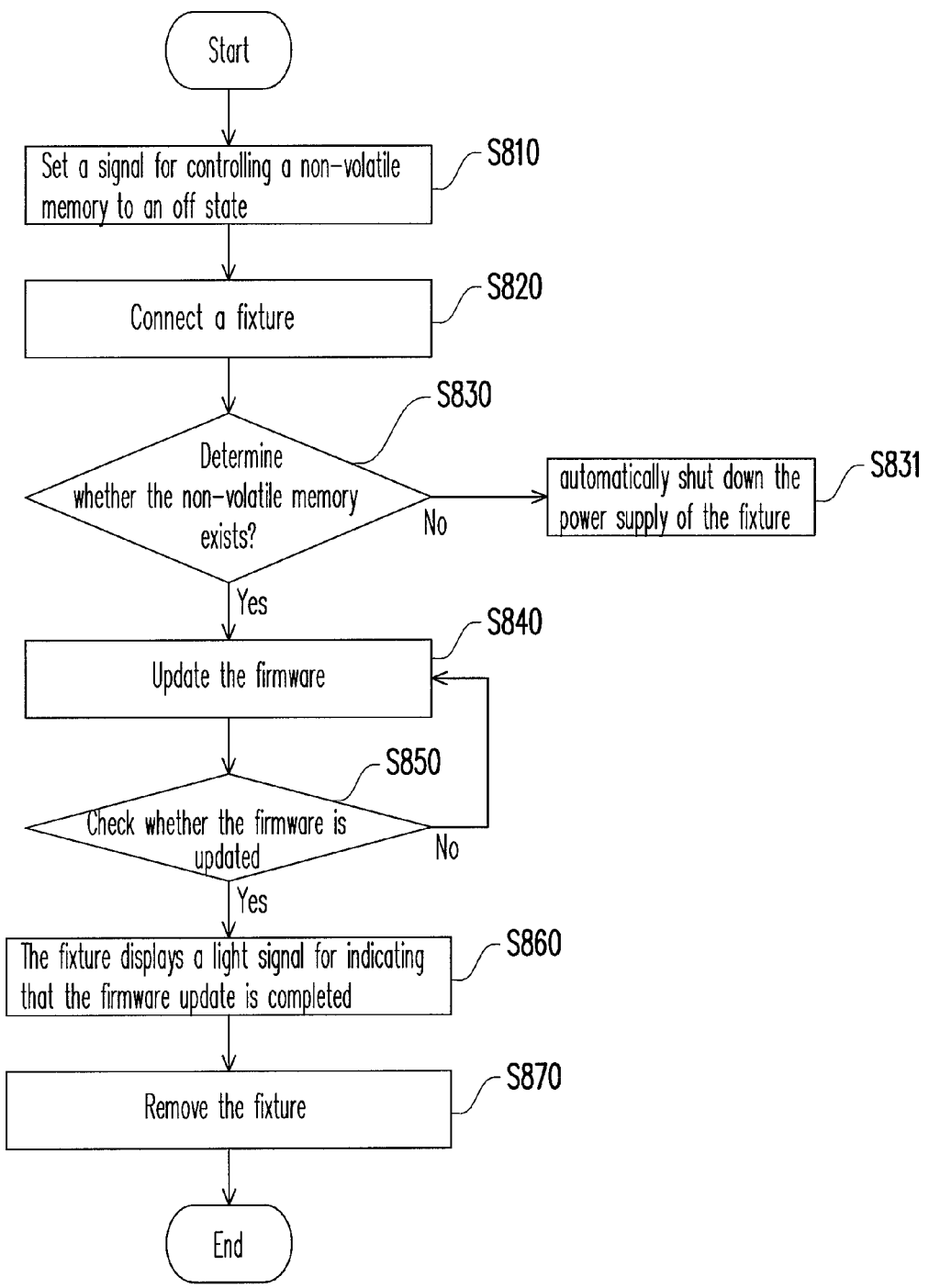
FIG. 11 is a flowchart of a firmware updating process according to an embodiment of the present invention.

FIG. 11 is a flowchart of a firmware update process according to an embodiment of the present invention. First, in step S810, a mode signal is set to switch a memory interface unit to a high-impedance state. Thus, all the signals of the memory interface unit connected to the non-volatile memory are turned off. Then, in step S820, a fixture for updating the firmware is connected to the non-volatile memory controller. Next, in step S830, whether the non-volatile memory for updating the firmware exists is determined. If the non-volatile memory does not exist (i.e., "no" in step S830), in step S831, the fixture automatically shuts off the power supply and stops the operation for updating the firmware. Contrarily, if the non-volatile memory exists (i.e., "yes" in step S830), in step S840, the firmware update fixture writes a new firmware into the non-volatile memory. After that, in step S850, the fixture checks whether the firmware is updated. If the firmware update process fails (i.e., "no" in step S850), step S840 is repeated to update the firmware again. Contrarily, if the firmware update process succeeds (i.e., "yes" in step S850), in step S860, the fixture indicates the success, for example, by flashing a light signal. Eventually, in step S870, the fixture is removed to complete the firmware update process.

As described above, in the present invention, a non-volatile memory controller can update a firmware without taking out the non-volatile memory. As a result, firmware update is made more convenient. Moreover, all the input signal paths connected to the non-volatile memory 160 are switched to an open state so that the other parts of the circuit won't be affected when the firmware in the non-volatile memory is updated. Thereby, the problem of bus contention is avoided. Furthermore, various pin disposition patterns are provided by the present invention such that the convenience in firmware update can be further improved and the layout area taken by the non-volatile memory controller can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-volatile memory controller, comprising:
   a firmware download port group, for coupled to a firmware update fixture;
   a memory interface unit, comprising at least one tri-state buffer component, wherein the memory interface unit is coupled to a non-volatile memory and the firmware download port group through the tri-state buffer component, and the tri-state buffer component determines whether to operate in a high-impedance mode or a normal mode according to a mode signal;
   a processing unit, coupled to the memory interface unit, wherein the processing unit accesses the non-volatile memory through the memory interface unit; and
   a host interface unit, coupled to the processing unit, wherein the processing unit provides a processing interface through the host interface unit to allow a host to access the non-volatile memory;
   wherein when the tri-state buffer component operates in the high-impedance mode according to the mode signal, the firmware update fixture writes a new firmware into the non-volatile memory through the firmware download port group.

2. The non-volatile memory controller according to claim 1, wherein the memory interface unit comprises:
the at least one tri-state buffer component; and
a memory control unit, coupled between the tri-state buffer component and the processing unit;
wherein the processing unit accesses the non-volatile memory through the memory control unit.

3. The non-volatile memory controller according to claim 1, wherein the memory interface unit comprises:
a memory control unit, coupled between the non-volatile memory and the processing unit, wherein the memory control unit comprises:
at least one bidirectional buffer, serving as the at least one tri-state buffer component; and
a control circuit, coupled between the bidirectional buffer and the processing unit, wherein the control circuit sets the bidirectional buffer to be in an input buffer mode, an output buffer mode, or the high-impedance mode according to the processing unit and the mode signal, and the processing unit accesses the non-volatile memory through the control circuit.

4. The non-volatile memory controller according to claim 1, wherein the tri-state buffer component is a tri-state buffer.

5. The non-volatile memory controller according to claim 1, wherein the tri-state buffer component comprises:
a buffer;
a switch, coupled between the buffer and the non-volatile memory, wherein the switch is in an "off" state in the high-impedance mode, and the switch is in an "on" state in the normal mode.

6. The non-volatile memory controller according to claim 1, being packaged with the non-volatile memory in a multi-chip package (MCP).

7. The non-volatile memory controller according to claim 6, wherein a lower side of the MCP is soldered on a printed circuit board (PCB), and the firmware download port group is disposed on an upper side of the MCP.

8. The non-volatile memory controller according to claim 6, wherein a lower side of the MCP is soldered on a PCB, and the firmware download port group is disposed at an edge of the lower side of the MCP.

9. The non-volatile memory controller according to claim 1, wherein a packaged lower side of the non-volatile memory controller is soldered on a PCB, and the firmware download port group is disposed on a packaged upper side of the non-volatile memory controller.

10. The non-volatile memory controller according to claim 1, wherein a packaged lower side of the non-volatile memory controller is soldered on a PCB, and the firmware download port group is disposed at an edge of the packaged lower side of the non-volatile memory controller.

11. A memory card, comprising:
a non-volatile memory; and
a non-volatile memory controller, comprising:
a firmware download port group, for coupled to a firmware update fixture;
a memory interface unit, comprising at least one tri-state buffer component, wherein the memory interface unit is coupled to the non-volatile memory and the firmware download port group through the tri-state buffer component, and the tri-state buffer component determines whether to operate in a high-impedance mode or a normal mode according to a mode signal;
a processing unit, coupled to the memory interface unit, wherein the processing unit accesses the non-volatile memory through the memory interface unit; and
a host interface unit, coupled to the processing unit, wherein the processing unit provides a processing interface through the host interface unit to allow a host to access the non-volatile memory;
wherein when the tri-state buffer component operates in the high-impedance mode according to the mode signal, the firmware update fixture writes a new firmware into the non-volatile memory through the firmware download port group.

12. The memory card according to claim 11, wherein the memory interface unit comprises:
the at least one tri-state buffer component; and
a memory control unit, coupled between the tri-state buffer component and the processing unit;
wherein the processing unit accesses the non-volatile memory through the memory control unit.

13. The memory card according to claim 11, wherein the memory interface unit comprises:
a memory control unit, coupled between the non-volatile memory and the processing unit, wherein the memory control unit comprises:
at least one bidirectional buffer, serving as the at least one tri-state buffer component; and
a control circuit, coupled between the bidirectional buffer and the processing unit, wherein the control circuit sets the bidirectional buffer to be in an input buffer mode, an output buffer mode, or the high-impedance mode according to the processing unit and the mode signal, and the processing unit accesses the non-volatile memory through the control circuit.

14. The memory card according to claim 11, wherein the tri-state buffer component is a tri-state buffer.

15. The memory card according to claim 11, wherein the tri-state buffer component comprises:
a buffer;
a switch, coupled between the buffer and the non-volatile memory, wherein the switch is in an "off" state in the high-impedance mode, and the switch is in an "on" state in the normal mode.

16. The memory card according to claim 11, wherein the non-volatile memory controller and the non-volatile memory are both packaged in a MCP.

17. The memory card according to claim 16, wherein a lower side of the MCP is soldered on a PCB, and the firmware download port group is disposed on an upper side of the MCP.

18. The memory card according to claim 16, wherein a lower side of the MCP is soldered on a PCB, and the firmware download port group is disposed at an edge of the lower side of the MCP.

19. The memory card according to claim 11, wherein a packaged lower side of the non-volatile memory controller is soldered on a PCB, and the firmware download port group is disposed on a packaged upper side of the non-volatile memory controller.

20. The memory card according to claim 11, wherein a packaged lower side of the non-volatile memory controller is soldered on a PCB, and the firmware download port group is disposed at an edge of the packaged lower side of the non-volatile memory controller.

* * * * *